(12) United States Patent
Abbaszadeh et al.

(10) Patent No.: US 7,613,757 B1
(45) Date of Patent: Nov. 3, 2009

(54) SYSTEM AND METHOD FOR PARALLEL PN GENERATION

(75) Inventors: Ayyoob Abbaszadeh, Salt Lake City, UT (US); Rahman Altaf, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 903 days.

(21) Appl. No.: 11/336,493

(22) Filed: Jan. 20, 2006

(51) Int. Cl.
*G06F 1/02* (2006.01)

(52) U.S. Cl. .................................... 708/250
(58) Field of Classification Search .......... 708/250–256
See application file for complete search history.

(56) References Cited

U.S. PATENT DOCUMENTS

| | | | |
|---|---|---|---|
| 4,375,620 A * | 3/1983 | Singer et al. ................ 708/250 |
| 5,550,846 A * | 8/1996 | Staiger ........................ 708/250 |
| 6,640,236 B1 | 10/2003 | Lupin et al. | |
| 7,174,355 B2 * | 2/2007 | Henry et al. ................ 708/250 |
| 2001/0003530 A1 | 6/2001 | Sriram et al. | |
| 2003/0122697 A1 | 7/2003 | Schooler et al. | |
| 2004/0015527 A1 | 1/2004 | Sriram et al. | |

* cited by examiner

*Primary Examiner*—Tan V Mai
(74) *Attorney, Agent, or Firm*—Kirton & McConkie; William T. Ralston

(57) ABSTRACT

The invention provides a system and method for generating a high rate pseudo-random noise (PN) code with a parallel PN generator. The method includes the operation of configuring L programmable PN generators to each output every $L^{th}$ chip of a PN code. Select PN generators of the L PN generators can be configured to have their output delayed for a predetermined number of chips less than or equal to L when a fine slip is needed to allow the high rate PN code to be delayed for a set number of chips to synchronize the high rate PN code with another PN code. The outputs of each of the L programmable PN generators can be multiplexed to produce the high rate PN code.

26 Claims, 10 Drawing Sheets

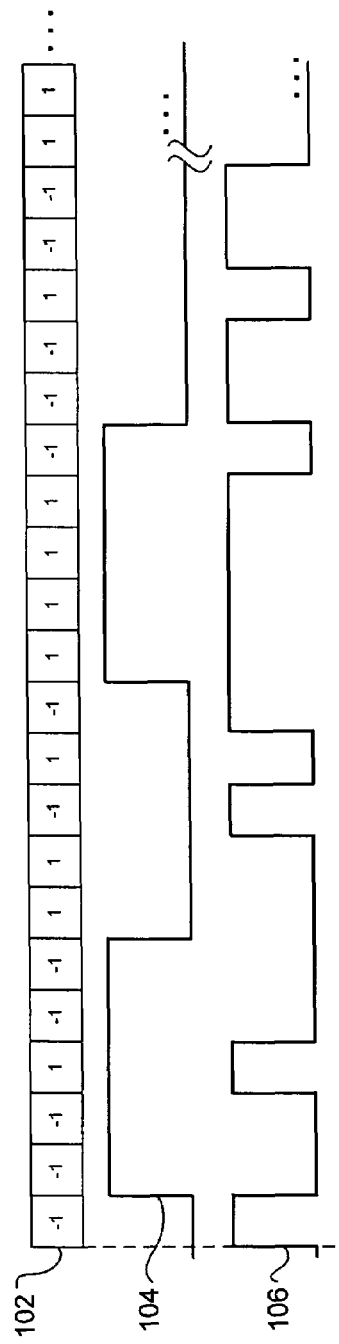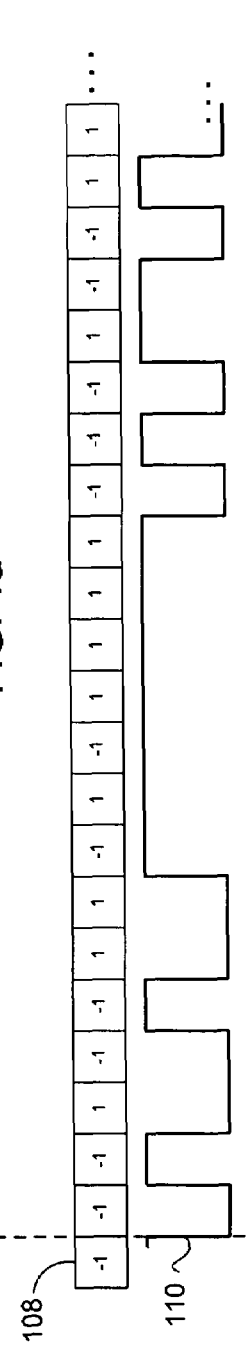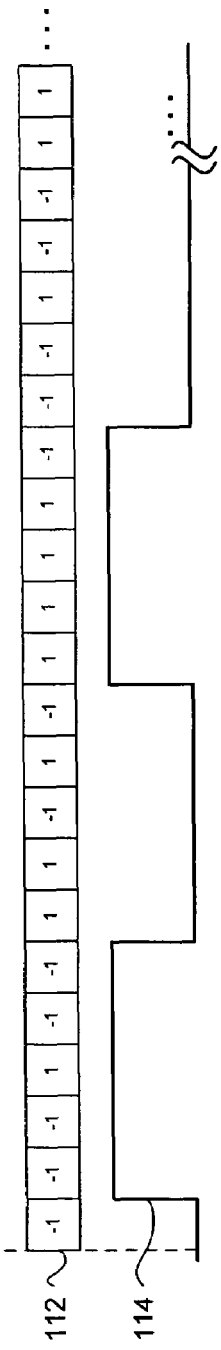

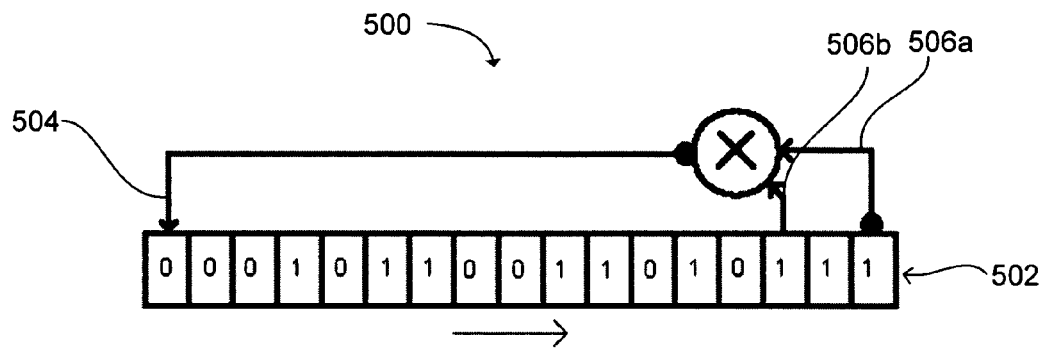
FIG. 5a
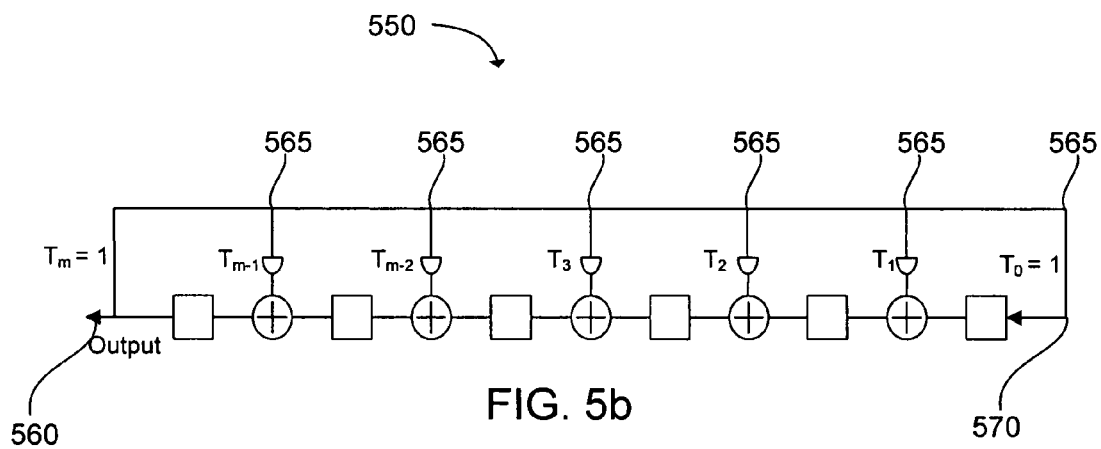
FIG. 5b
FIG. 5

PPN - CORE Block Diagram

SYSTEM AND METHOD FOR PARALLEL PN GENERATION

FIELD OF THE INVENTION

The present invention relates generally to pseudo-random noise generation.

BACKGROUND

A pseudo-random noise (PN) code sequence is a binary sequence that repeats itself after a large number of cycles. Thus, the binary numbers in the sequence are not truly random, but if the repetition cycle of the sequence is long enough its spectrum shares many of the properties of random electromagnetic noise. PN codes have a variety of uses in modern electronics. They are used in everything from GPS receivers to spread spectrum handsets in wireless and cellular phones.

As the speed and bandwidth of communication devices have increased, it has become necessary to generate the PN codes at an ever increasing speed. When PN codes are used in spread spectrum systems, the PN code is typically generated at a speed several times greater than the bandwidth of the signal. The speed of the PN code is related to the amount of data transmitted on a signal. However, the speed of the hardware used to generate certain types of PN codes has not kept up with the speed of other areas in a communications device. For example, a communications device may be designed to transmit and receive a signal having a bandwidth of 800 MHz in BPSK modulation. A PN code is typically generated at a rate substantially higher than the modulated signal. Generating a PN code at this rate can be extremely challenging.

Standard PN generators typically advance one state of a PN sequence every clock cycle. Thus, a bottleneck may occur in spread spectrum communication devices due to the low speed of the PN code generation circuitry relative to the speed of the communications device.

One method for increasing the speed of PN code production is to use several PN code generators in parallel. By placing four PN code generators in parallel, it may be possible to generate a PN code up to four times as fast. However, due to the nature of the PN code, it is desirable to be able to alter the generated code in a number of ways. For example, in order to synchronize a PN code on an incoming signal with a PN code generated at the receiver, the PN code at the receiver may be delayed for a predetermined number of chips. Simply combining multiple PN generators together to generate PN codes at an increased rate can severely limit the usefulness and flexibility of the parallel generated PN code. For instance, a PN generator comprised of four PN generators multiplexed together cannot be delayed by any predetermined number of chips by simply delaying each of the PN generators by ¼ of the predetermined delay.

SUMMARY

The invention provides a system and method for generating a high rate pseudo-random noise (PN) code with a parallel PN generator. The method includes the operation of configuring L programmable PN generators to each output every $L^{th}$ chip of a PN code. Select PN generators of the L PN generators can be configured to have their output delayed for a predetermined number of chips less than or equal to L when a fine slip is needed to allow the high rate PN code to be delayed for a set number of chips to synchronize the high rate PN code with another PN code. The outputs of each of the L programmable PN generators can be multiplexed to produce the high rate PN code.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIGS. 1a-c are diagrams showing an example of a PN code modulated on a carrier signal;

FIG. 5a is an illustration of a programmable PN generator that is implemented using a predetermined number of linear feedback shift registers (LFSR) in accordance with an embodiment of the present invention;

FIG. 5b is an illustration of an LFSR in a Galois configuration in accordance with an embodiment of the present invention;

DETAILED DESCRIPTION OF EXAMPLE EMBODIMENTS

Figure 2:
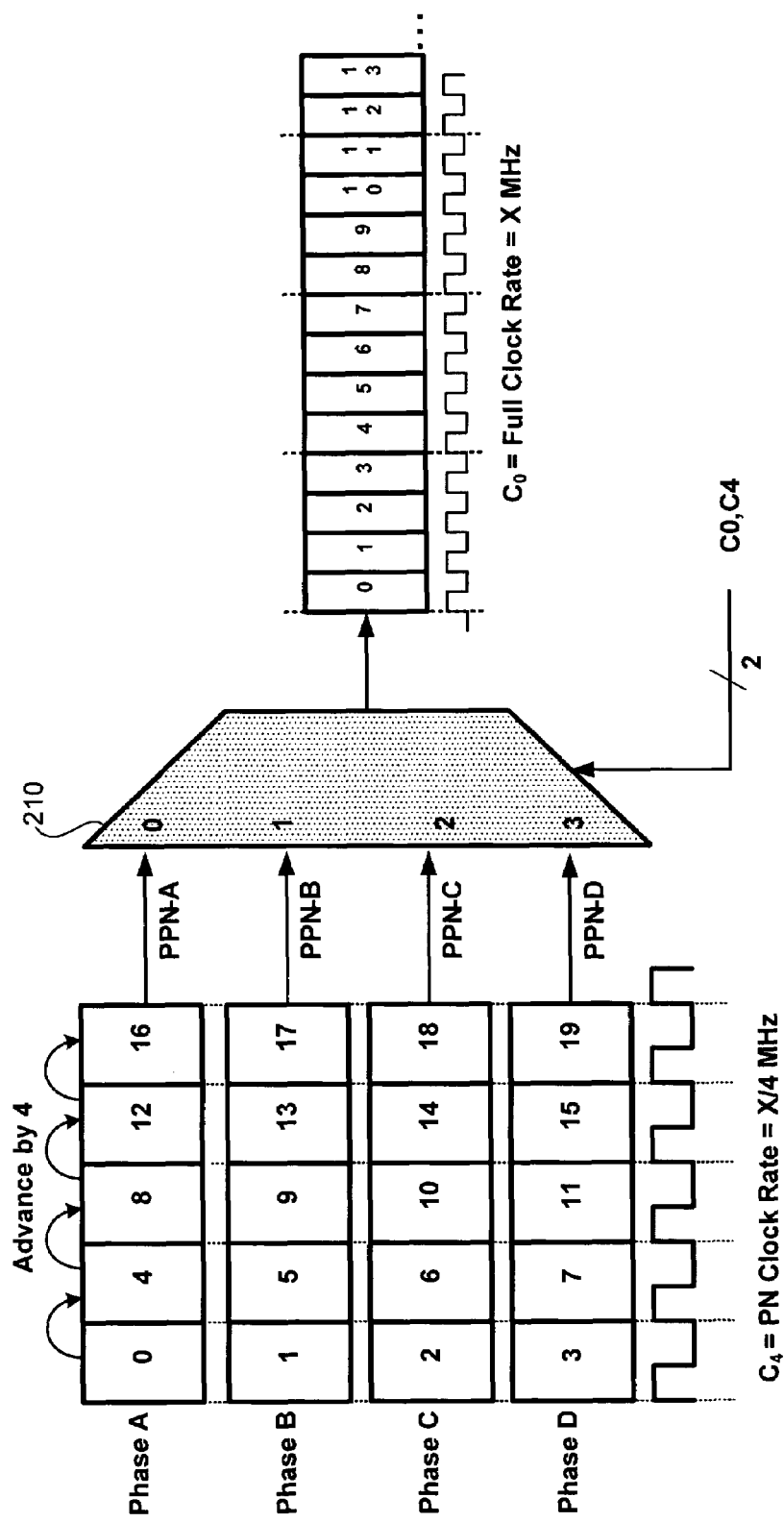
FIG. 2 is a diagram of a plurality of PN generators with their outputs multiplexed together.

Before a signal carrying information can be transmitted in electronic format, the information signal is typically converted to a sinusoidal waveform using bandpass modulation. Bandpass modulation can be either digital or analog. For digital modulation, a sinusoid of duration T is referred to as a digital symbol. The sinusoid has three features that can be used to distinguish it from other sinusoids: amplitude, frequency, and phase. Thus, the bandpass modulation can be defined as the process whereby the amplitude, frequency, or phase of a carrier signal (or a combination of them) can be varied in accordance with the information to be transmitted.

For example, phase shift keying (PSK) can be accomplished by varying the phase of the carrier signal according to the equation $$s_i(t) = \sqrt{\frac{2E}{T}} \cos[\omega_o t + \phi_i(t)] \quad 0 \le t \le T$$

$$i = 1, \ldots, M$$

Where $\omega_o$ is the radian frequency of the carrier, E is the energy in joules of the carrier per T seconds, and the phase term $\phi_i(t)$ has M discrete values, typically given by $$\phi_i(t) = \frac{2\pi i}{M} \quad i = 1, \ldots, M$$

Once the signal has been modulated onto the carrier signal, the modulated carrier signal can then be spread using a PN code. The PN code is comprised of a pseudo random digital signal. The PN code is designed to simulate random noise, but unlike real noise, the PN code repeats after a specified interval, making it a pseudo random signal. The location where the PN code repeats is referred to as the PN Epoch.

Spreading the modulated carrier signal with the PN code can be accomplished using a PSK modulation technique. Rather than modulating the data signal onto the carrier, as above, a PN code signal is modulated onto the modulated carrier signal. The data rate of the PN code signal, commonly referred to as the chip rate, is typically substantially larger than the symbol rate of the modulated carrier signal. For example, the data (chip) rate of the PN code signal can be 1.2 to 5 (or more) times greater than the symbol rate. Thus, a plurality of PN chips can be modulated onto each symbol in the modulated carrier signal. It is also possible to reverse the steps above, wherein the signal is first spread by modulating it with a PN code and then the information is modulated onto the spread signal.

At the receiving end of the data link, the signal must be either demodulated and despread or despread and demodulated in order to recover the information signal. The spread signal can be despread by modulating the spread signal with the same PN code used to spread it. The PN code at the receiving end must be synchronized with the PN code modulated onto the spread signal in order for the signal to be despread.

A simple example of spreading and despreading a signal is shown in FIGS. 1a-1c. As shown in FIG. 1a, the modulated carrier signal 104 can be spread before being transmitted by modulating the carrier signal with a PN code 102 resulting in a spread spectrum signal 106. In this example the chip rate, the clock rate of the PN code, is five times faster than the clock rate of the modulated carrier signal. The actual speed of the chip rate of the PN code relative to the clock rate of the carrier signal is determined by the amount of spreading desired. The chip rate is typically an integer multiple times faster than the clock rate of the carrier signal.

The PN code at the receiver must be synchronized, or aligned, with the PN code 102 that was modulated onto the carrier signal when it was transmitted. If the PN code at the receiver is unaligned 108 from the PN code modulated onto the spread spectrum signal by just a single chip, as shown in FIG. 1b, then the PN modulation will result in a scrambled signal 110 having many of the characteristics of random noise. Once the PN code at the receiver is substantially aligned 112 with the PN code 102 (FIG. 1a) modulated onto the carrier signal, re-modulating the spread spectrum signal with the substantially aligned PN code will result in obtaining the original modulated carrier signal 114, as shown in FIG. 1c.

As computing power and data storage have exponentially increased over the last several decades, a corresponding amount of data has also exponentially increased. Computers which were once the domain of text files and a few low resolution pictures are now often used to store thousands of high resolution pictures and hours of video. Television sets are being upgraded to show high definition video. New generations of optical discs have been developed to hold the high definition video. The discs can hold as much as 50 gigabytes of data on each side, enough to store a three hour movie in a high definition format.

Another recent trend has been a move toward an increasingly wireless infrastructure. Each year, more electronic devices are available that can communicate wirelessly. Electronics including computers, telephones, computer mouse, telephone headsets, gaming controllers, and many other types of devices have been designed to operate without the need for physical communication paths. Many computers now receive broadband internet which is broadcast throughout the home. Cell phones are able to receive and transmit pictures using complex third generation cellular phone infrastructures. Televisions, many of which had been receiving television signals through a cable, are now receiving high definition signals from satellites and local digital transmitters.

In order to transmit the vast quantities of data stored in computers and broadcast to televisions and other electronics, a large amount of bandwidth is necessary. Bandwidth is proportional to the amount of data which is transmitted over a period of time, usually measured in seconds. For example, to transmit a 15 gigabyte high definition movie stored on a DVD to a wireless home entertainment system, it requires 100 megabits transmitted per second for twenty minutes.

One simple way to provide a level of security to all of the data being transmitted and to reduce interference with other transmitters and receivers is to spread the data carrier signal using a PN code. Assuming (as shown in FIGS. 1a-1c) that the data carrier signal is spread at a chip rate five times faster than the data rate, the transmission of a signal transmitting 100 megabits per second of data requires a PN code chip rate of 500 megachips per second. At 500 megachips per second, the amount of time between each chip is less than 2 nanoseconds. Producing a pseudo-random sequence of bits at that rate can be extremely difficult, if not impossible, with current technology.

As previously discussed, one method which can be used to produce the PN code at the increased rate is to use a plurality of PN generators and multiplex their outputs together. For example, four PN generators running at 125 MHz can produce the necessary 500 megabits per second PN code. A graphical example is shown in FIG. 2. Four PN generators can be used to produce the phase A, B, C, and D outputs. Each generator can be configured to advance by 4. Thus, phase A can be 0, 4, 8, 12, and 16. Phase B can be 1, 5, 9, 13, and 17, and so forth. The PN clock rate for each of the generators can be ¼ of the full clock rate. A multiplexer 210 operating at four times the speed of each PN generator can be used to combine the output of the four PN generators. The multiplexer can be configured to combine the four outputs in a manner that will enable the multiplexer output 215 to be numbered sequentially, as shown. Thus, the four PN generators operating at one quarter speed can produce a PN code having the desired chip rate.

It should be noted that, due to the cyclical nature of a PN code, it is possible to obtain the same results by either advancing or delaying a PN generator until the PN code is at the desired location. Thus, the use of the terms advance and delay, as used herein with respect to a PN generator, are deemed to be synonymous.

Synchronizing a PN code produced by a parallel PN generator with a received signal can prove to be difficult. The output of the parallel PN generator is typically either moved forward or backward relative to a PN code on a received signal until the two codes are substantially aligned. When using a single PN generator, the output can merely be delayed by a predetermined number of clock cycles until the output is synchronized with the received signal. However, the output of the parallel PN generator is dependent upon the multiplexer which combines the output of all of the PN generators. Therefore, the output cannot merely be delayed by a predetermined number of clock cycles by freezing the output of each of the PN generators.

An embodiment of the present invention provides a method for slipping the PN code produced by the plurality of PN generators. Slipping the PN code can enable the PN code to be aligned with a timed signal, such as the PN code on another signal. The other signal may be a received signal, a transmitted signal, or other type of signal that was modulated with a PN code. The PN code can be delayed, or slipped, by a predetermined number of chips until the PN code produced by a parallel PN generator is synchronized with the PN code modulated onto the other signal. In one embodiment, the following equation can be used to enable the PN code to be synchronized:

$$N = Lm + R; R < L,$$

where N is the number of chips to be slipped, L is the number of PN generators, m is the number of clock cycles each of the L generators should be placed in a frozen state, and R is a remainder. Both m and R should be whole numbers.

Thus, in the example above using four PN generators, if it is determined that the parallel PN generator output should be slipped by 85 chips, then:

$$85 = 4m + R,$$

A solution to the equation which enables m and R to be whole numbers is m=21 and R=1. The value of m represents the number of clock cycles in which the outputs of all of the PN generators are frozen, which is known as a coarse slip. By freezing each of the four generators for 21 clock cycles, the output of the multiplexer can be delayed by 84 chips. However, a different solution is needed to slip the PN code by one more chip, represented by the remainder R.

Figure 3:
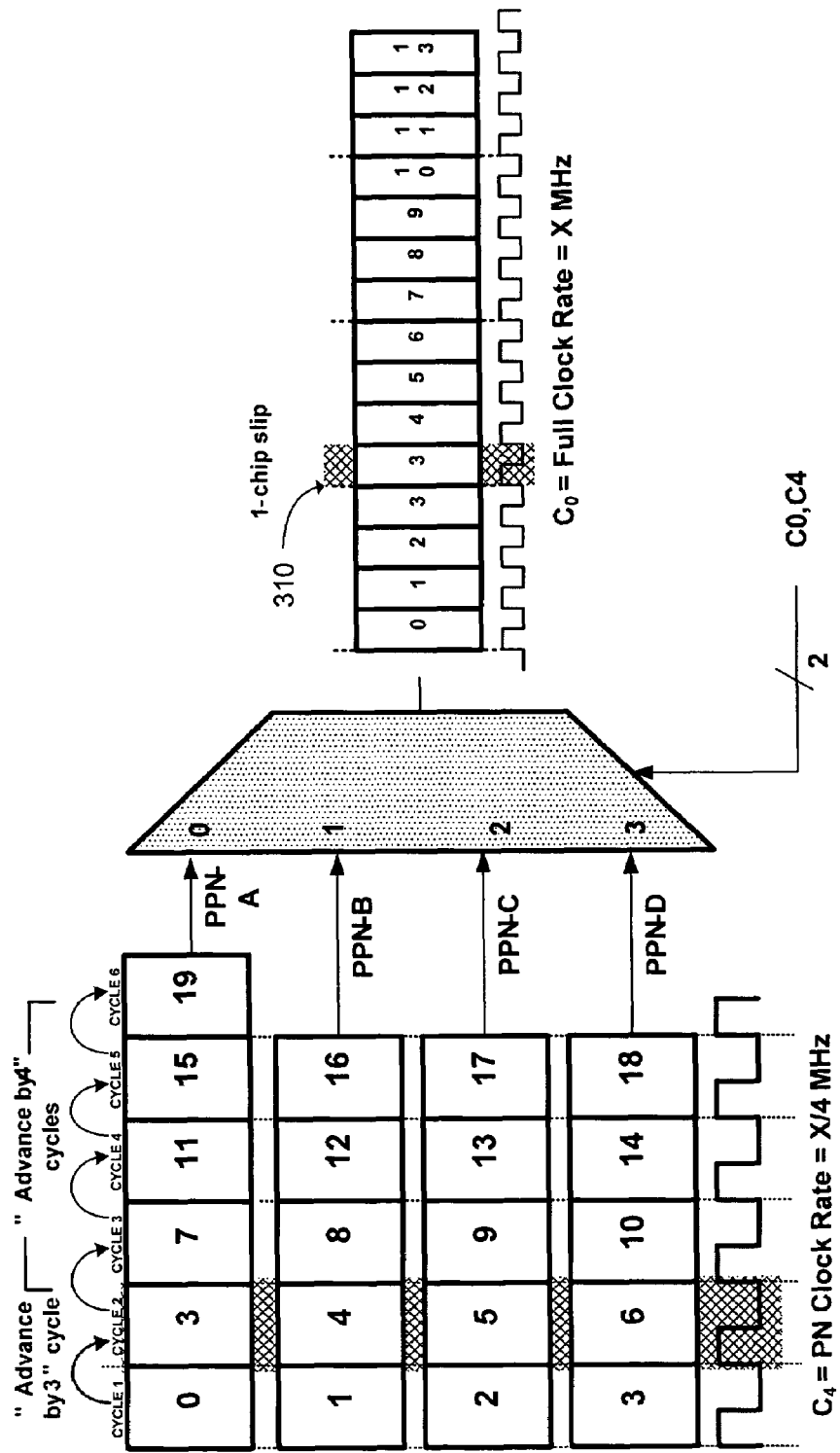
FIG. 3 is a diagram displaying a method for slipping the output of a parallel PN generator having L PN generators by one chip.

In one embodiment, the parallel PN generator output may be slipped by less than L chips by advancing selected PN generators by an amount less than L during one or more cycles, which is known as a fine slip. One way in which the multiplexed output can have a fine slip of a single chip is shown in FIG. 3. It is shown that each PN generator is advanced by 3 from cycle 1 to cycle 2. The PN generators can then continue to be advanced by 4. When the output of the PN generators is multiplexed together, the result is a one chip slip 310, wherein a single chip is repeated once to enable the overall PN code to slip one chip. The output of the multiplexer can be delayed by any number of chips by combining m coarse slips with R fine slips.

Figure 4:
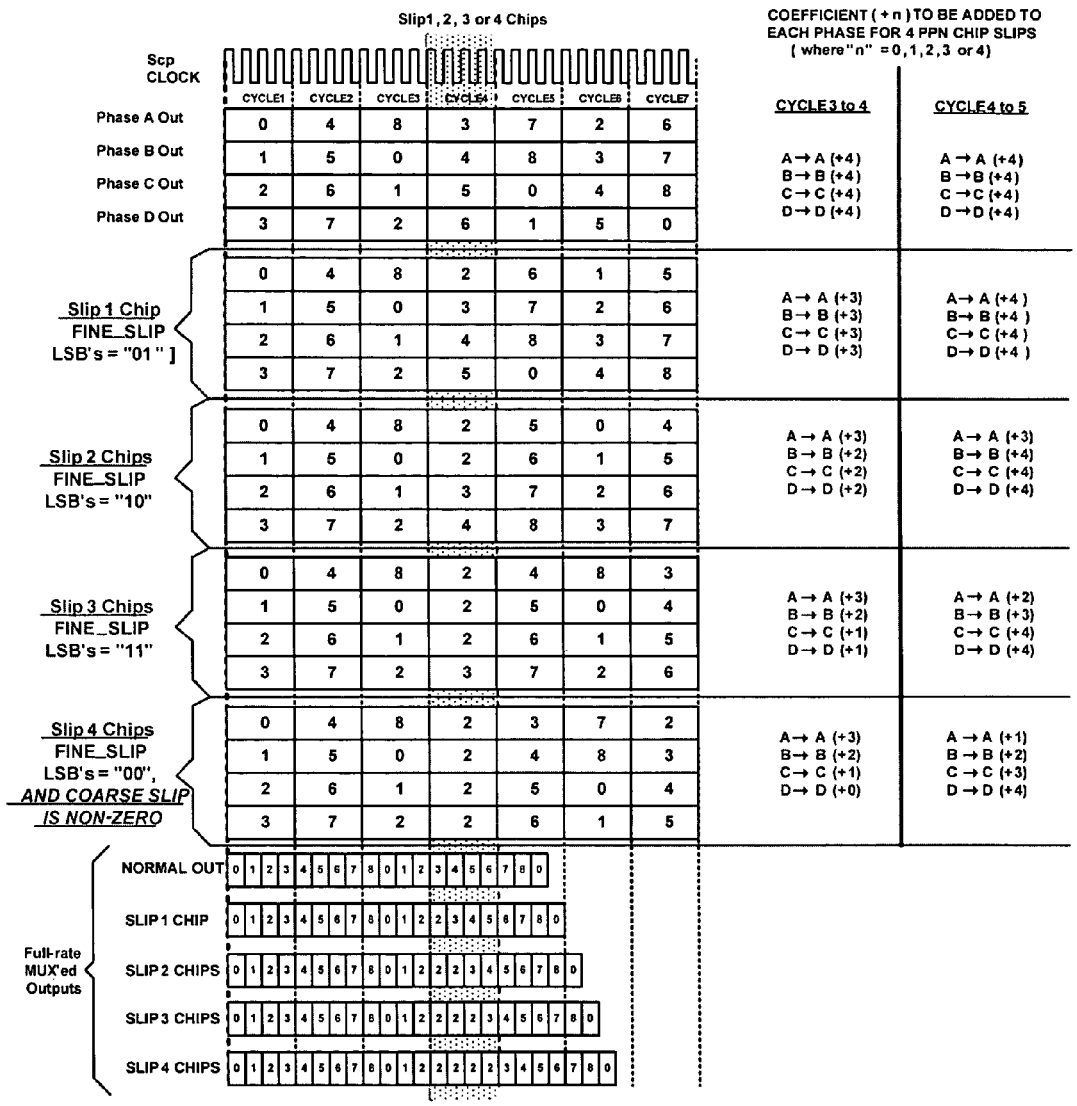
FIG. 4 is a diagram displaying a method for slipping the output of a parallel PN generator having 4 PN generators by 1, 2, 3, or 4 chips in accordance with an embodiment of the invention.

A more complete diagram is displayed in FIG. 4, showing one way in which the output of each PN generator can be delayed to accomplish a fine slip of 2, 3, or 4 chips. In this example it is shown that a two chip slip in a system having four parallel PN generators can occur by advancing each phase, or PN generator, between cycles as follows:

| Cycle 3 to 4 | Cycle 4 to 5 |
| --- | --- |
| Phase A (+3) | Phase A (+3) |
| Phase B (+2) | Phase B (+4) |
| Phase C (+2) | Phase C (+4) |
| Phase D (+2) | Phase C (+4) |

To slip the output of the multiplexer by three chips in a system having four parallel PN generators, each phase can be advanced between cycles as follows:

| Cycle 3 to 4 | Cycle 4 to 5 |
| --- | --- |
| Phase A (+3) | Phase A (+2) |
| Phase B (+2) | Phase B (+3) |
| Phase C (+1) | Phase C (+4) |
| Phase D (+1) | Phase C (+4) |

In one embodiment, when the remainder R is equal to zero and m is a non-zero number, the four parallel PN generators can be configured to advance by four chips by advancing each phase between cycles as follows:

| Cycle 3 to 4 | Cycle 4 to 5 |
| --- | --- |
| Phase A (+3) | Phase A (+1) |
| Phase B (+2) | Phase B (+2) |
| Phase C (+1) | Phase C (+3) |
| Phase D (+0) | Phase C (+4) |

It is to be understood that there are a number of ways in which the PN generators can be advanced in order to accomplish a fine slip of less than L chips. The examples given above are not meant to be a limitation, only to show one embodiment for advancing the parallel PN generator system ("P-PN") by a predetermined number of chips in order to synchronize the output of the system to a PN code on a received signal. The example shows a system having four parallel PN generators. However, any number of PN generators may be used to obtain a desired chipping rate.

General equations can be derived for advancing a system having a plurality of parallel PN generators, wherein each generator has a predetermined number of stages. For example, for a system having four generators, each with a 17 stage PN with taps $T_{(0-16)}$, the system can be advanced by 1, 2, 3, or 4 cycles as follows:

Let the current state of a P-PN be Stage $Z_i$ (n−1) {for i=0 to 16}

Advance by 1:

$$Z_{(i)}(n) = [T_{(i)} \text{ AND } Z_{16}(n-1)] \text{ XOR } Z_{(i-1)}(n-1)$$

Advance by 2:

$$Z_{(i)}(n+1) = [T_{(i)} \text{ AND } M_{16}] \text{ XOR } [T_{(i-1)} \text{ AND } Z_{16}(n-1)] \\ \text{ XOR } Z_{(i-2)}(n-1)$$

Advance by 3:

$$Z_{(i)}(n+2) = [T_{(i)} \text{ AND } L_{16}] \text{ XOR } [T_{(i-1)} \text{ AND } M_{16}] \text{ XOR } [T_{(i-2)} \text{ AND } Z_{16}(n-1)] \text{ XOR } Z_{(i-3)}(n-1)$$

Advance by 4:

$Z_{(i)}(n+3) = [T_{(i)} \text{AND } R_{16}] \text{XOR} [T_{(i-1)} \text{AND } L_{16}] \text{XOR} [T_{(i-2)} \text{AND } M_{16}] \text{XOR} [T_{(i-3)} \text{AND } Z_{16}(n-1)] \text{XOR} Z_{(i-4)}(n-1)$ {where:
$M_{16} = [T_{16} \text{ AND } Z_{16}(n-1)] \text{ XOR } Z_{15}(n-1)$,
$L_{16} = [T_{16} \text{ AND } M_{16}] \text{ XOR } [T_{15} \text{ AND } Z_{16}(n-1)] \text{ XOR } Z_{14}(n-1)$,
$R_{16} = [T_{16} \text{ AND } L_{16}] \text{ XOR } [T_{15} \text{ AND } M_{16}] \text{ XOR } [T_{14} \text{ AND } Z_{16}(n-1)] \text{ XOR } Z_{13}(n-1)$, and
$T_{-1} = T_{15}$, $T_{-2} = 0$, $T_{-3} = 0$, $T_{-4} = 0$, $Z_{-1} = 0$, $Z_{-2} = 0$, $Z_{-3} = 0$, $Z_{-4} = 0$, ...}

A programmable parallel PN generator can be implemented using a predetermined number of linear feedback shift registers 500 ("LFSR"), as shown in FIG. 5a. An LFSR is a plurality of shift registers 502 whose input 504 is the exclusive-or ("XOR") of one or more of its outputs 506a, 506b. The outputs that influence the input are called taps. Desired taps can be stored in a taps register and/or input from another device. The tap sequence of an LFSR can be represented as a polynomial mod 2, called a feedback polynomial. For example, if the taps are positions 17 and 15, as shown in FIG. 5a, the polynomial is $x^{17} + x^{15} + 1$.

In one embodiment, an LFSR in a Galois configuration 550 can be used, as shown in FIG. 5b. A Galois configuration is configured such that the output 560 is individually XOR'd with each tap 565 before becoming the new input 570. Because Galois LFSRs do not concatenate every tap to produce the new input, it is possible for each tap to be computed in parallel, thus increasing the speed of execution.

LFSR generators can produce what are called linear recursive sequences. The length of the sequence before repetition typically depends upon two things, the feedback taps and the initial state. An LFSR of any given size m, where m is equal to the number of registers, is capable of producing every possible state during the period $N = 2^m - 1$. However, this can only occur if the proper sequence feedback taps, or terms, have been chosen. Such a sequence is called a maximal length sequence, or m-sequence. An m-sequence is typically chosen for its optimal noise-like characteristics. Useful m-sequences are well known to those skilled in the art.

In addition to producing the sequence $N = 2^m - 1$, a trivial result of zero can be produced by the LFSR when the initial state is filled with zeroes. Together, the two sequences result in the production of all $2^m$ states in an m state register.

Near the end of each pseudorandom noise sequence a predefined chip in the sequence can be used to signify the end of the sequence. This chip is known as the epoch. The epoch can be stored in an epoch register. In one embodiment, the epoch may occur at the end of the sequence. It can be determined in advance that the epoch will occur in a specific amount of time. For example, it may be possible to determine that the epoch will occur in 16 chips. This is known as an early epoch detection.

Figure 6:
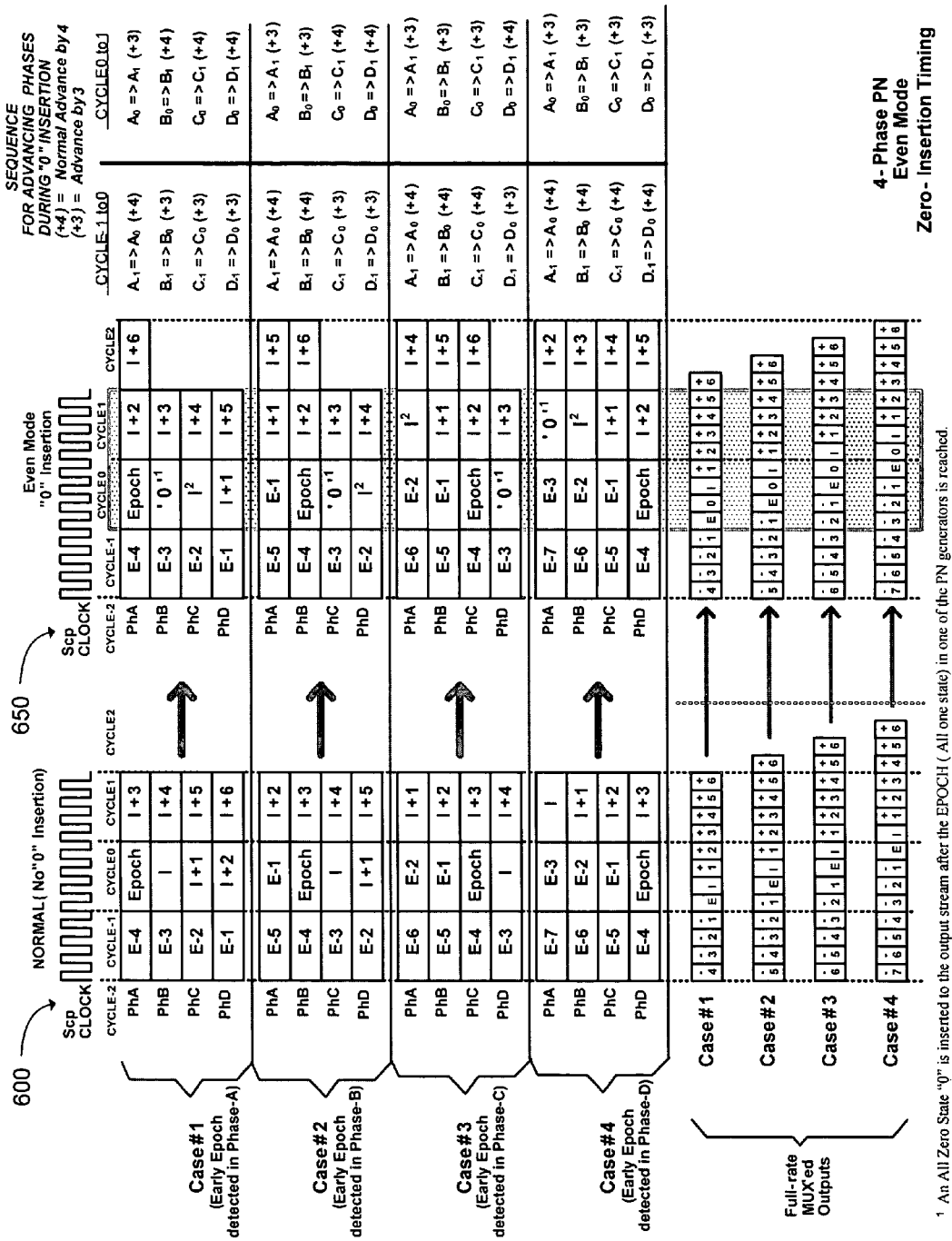
FIG. 6 is a diagram displaying a method for inserting a zero at any point of the output of a parallel PN generator in any of the PN generators comprising the parallel PN generator in accordance with an embodiment of the present invention.

FIG. 6 shows an example of early epoch detection in a parallel PN generator to enable a zero insertion in order to generate an even mode pseudorandom noise sequence. As previously discussed, a typical maximal length sequence can have $2^m - 1$ states. By inserting a "0" state after the epoch the sequence can be lengthened to have $2^m$ states, an even number. This is known as an even mode sequence. In Case #1 of FIG. 6 it is shown that an early epoch has been detected and the epoch will occur in phase A of a parallel PN generator having four stages, phases A-D respectively. An initial all 1's state can then be generated and the output of each phase can be advanced by one. An All Zero State "0" can be inserted to the output stream after the EPOCH (all 1's state) in one of the PN generators is reached. A pre-computed initial state unique to any of the L programmable PN generators can also be loaded at predetermined locations after the EPOCH state is reached, as shown in the tables of FIG. 6.

To insert a zero after the phase A epoch in a system having four PN generators, each phase can be advanced between cycles as follows:

| Cycle −1 to 0 | Cycle 0 to +1 |
|---|---|
| Phase A (+4) | Phase A (+3) |
| Phase B (+3) | Phase B (+4) |
| Phase C (+3) | Phase C (+4) |
| Phase D (+3) | Phase C (+4) |

The all 1's initial state (1) can be superimposed on the output stream with a '0'. A second initial (1) state cycle can be duplicated in the following phase. To account for the addition of the zero state, the four phases following the epoch can be advanced by three. The output can then be multiplexed, with the result of case #1 shown in FIG. 6.

Similarly, an epoch can occur in any of the other phases B-D and a zero can be inserted after the epoch as shown in case #2-4 respectively. While the example is for a system having four PN generators, any number of PN generators may be used to obtain a desired chipping rate.

Figure 7:
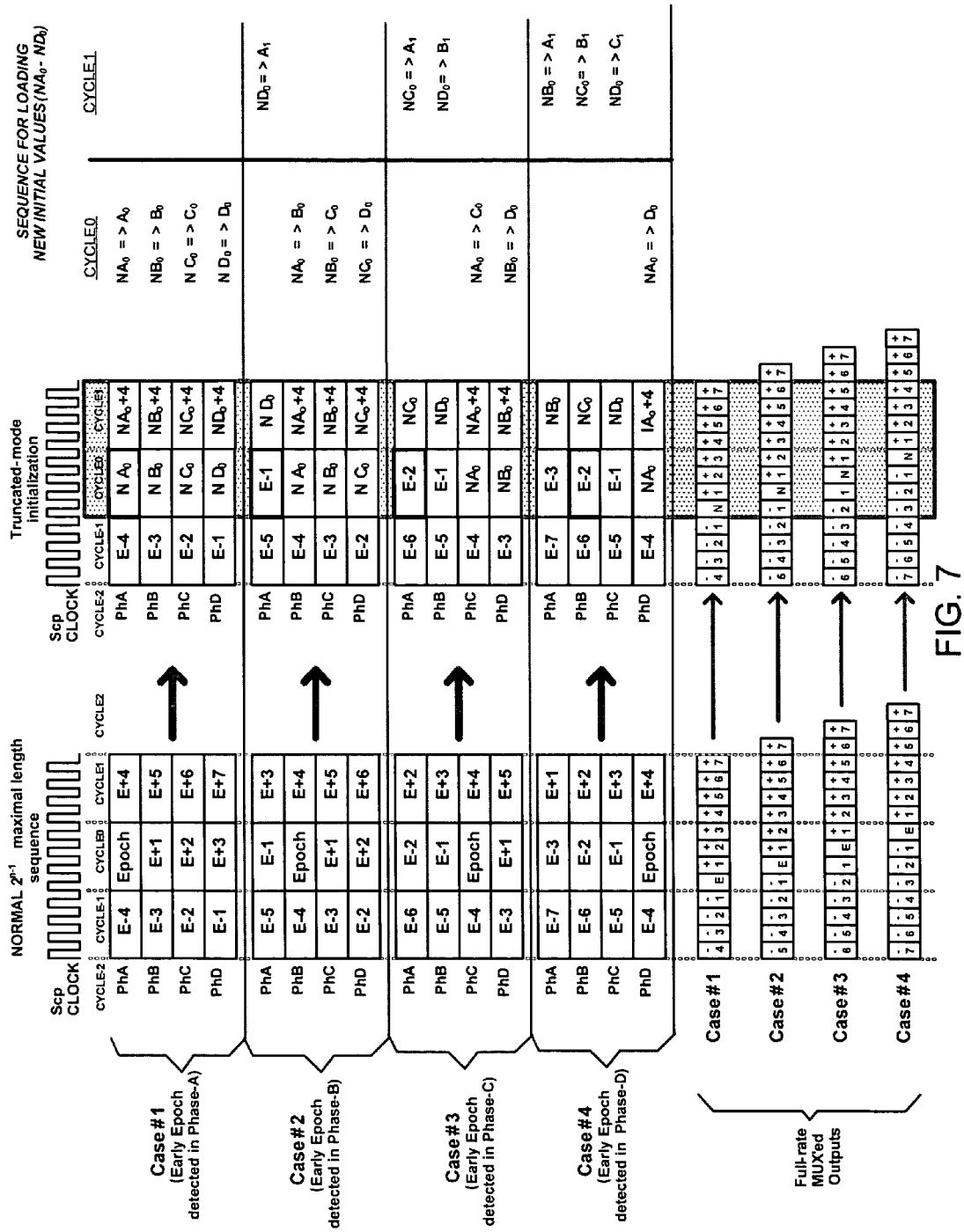
FIG. 7 is diagram displaying a method for inserting a truncated mode pseudorandom sequence by loading new initial values (E) in any of the L programmable PN generators comprising the parallel PN generator in accordance with an embodiment of the present invention.

It may be desired to skip a portion of a full PN code sequence. To accomplish this, a truncated pseudorandom noise sequence can also be inserted after an epoch. The truncated sequence can comprise a shortened PN code sequence which begins at a predetermined point in the sequence and is then output in order from that point. FIG. 7 shows a normal $2^m - 1$ maximal length sequence.

To insert a truncated mode pseudorandom sequence after the phase A epoch in a system having four PN generators, each phase can have new initial values inserted at the epoch. A sequence for loading new initial values $NA_0$-$ND_0$ can be accomplished as follows:

| Cycle 0 | Cycle 1 |
|---|---|
| $NA_0 \rightarrow A_0$ | |
| $NB_0 \rightarrow B_0$ | |
| $NC_0 \rightarrow C_0$ | |
| $ND_0 \rightarrow D_0$ | |

Each of the phases can then be advanced by four. The resultant multiplexed output will appear to switch to a truncated mode sequence at the end of the first sequence.

A sequence for loading new initial values $NA_0$-$ND_0$, starting with an epoch occurring at phase B, can be accomplished as follows:

| Cycle 0 | Cycle 1 |
|---|---|
| | $ND_0 \rightarrow A_1$ |
| $NA_0 \rightarrow B_0$ | |
| $NB_0 \rightarrow C_0$ | |
| $NC_0 \rightarrow D_0$ | |

Each of the phases can then be advanced by four. Note that the initial value $ND_0$ is actually loaded into the position at phase A, cycle one in this example.

A sequence for loading new initial values $NA_0$-$ND_0$, starting with an epoch occurring at phase C, can be accomplished as follows:

| Cycle 0 | Cycle 1 |
|---|---|
|  | $NC_0 \to A_1$ |
|  | $ND_0 \to B_1$ |
| $NA_0 \to C_0$ |  |
| $NB_0 \to D_0$ |  |

Again, each of the phases can then be advanced by four.

Finally, a sequence for loading new initial values $NA_0$-$ND_0$, starting with an epoch occurring at phase D, can be accomplished as follows:

| Cycle 0 | Cycle 1 |
|---|---|
|  | $NB_0 \to A_1$ |
|  | $NC_0 \to B_1$ |
|  | $ND_0 \to C_1$ |
| $NA_0 \to D_0$ |  |

As above, each of the phases can then be advanced by four. Thus, it is possible to insert a truncated mode at an epoch no matter which phase the epoch occurs in. It may be necessary to have an early epoch detector to allow the hardware and/or software time to generate the new initial values $NA_0$-$ND_0$ and insert them after the epoch. While the example is for inserting a truncated pseudorandom noise sequence after an epoch in a system having four PN generators, any number of PN generators may be used to obtain a desired chipping rate.

Figure 8A:
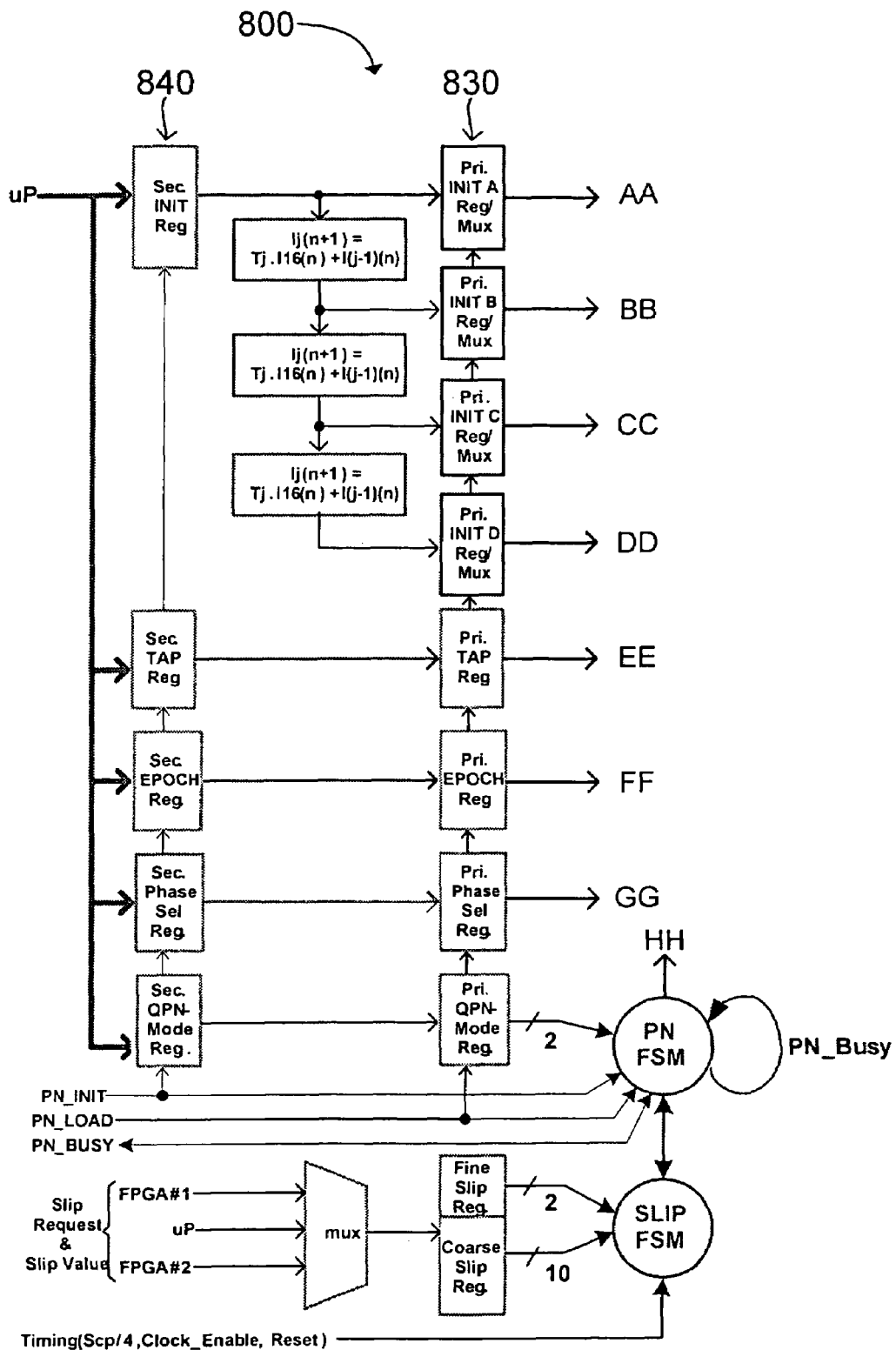
FIG. 8a is a first page of an illustration depicting an example embodiment of a parallel PN generator system comprised of L PN generators in accordance with an embodiment of the present invention.
Figure 8B:
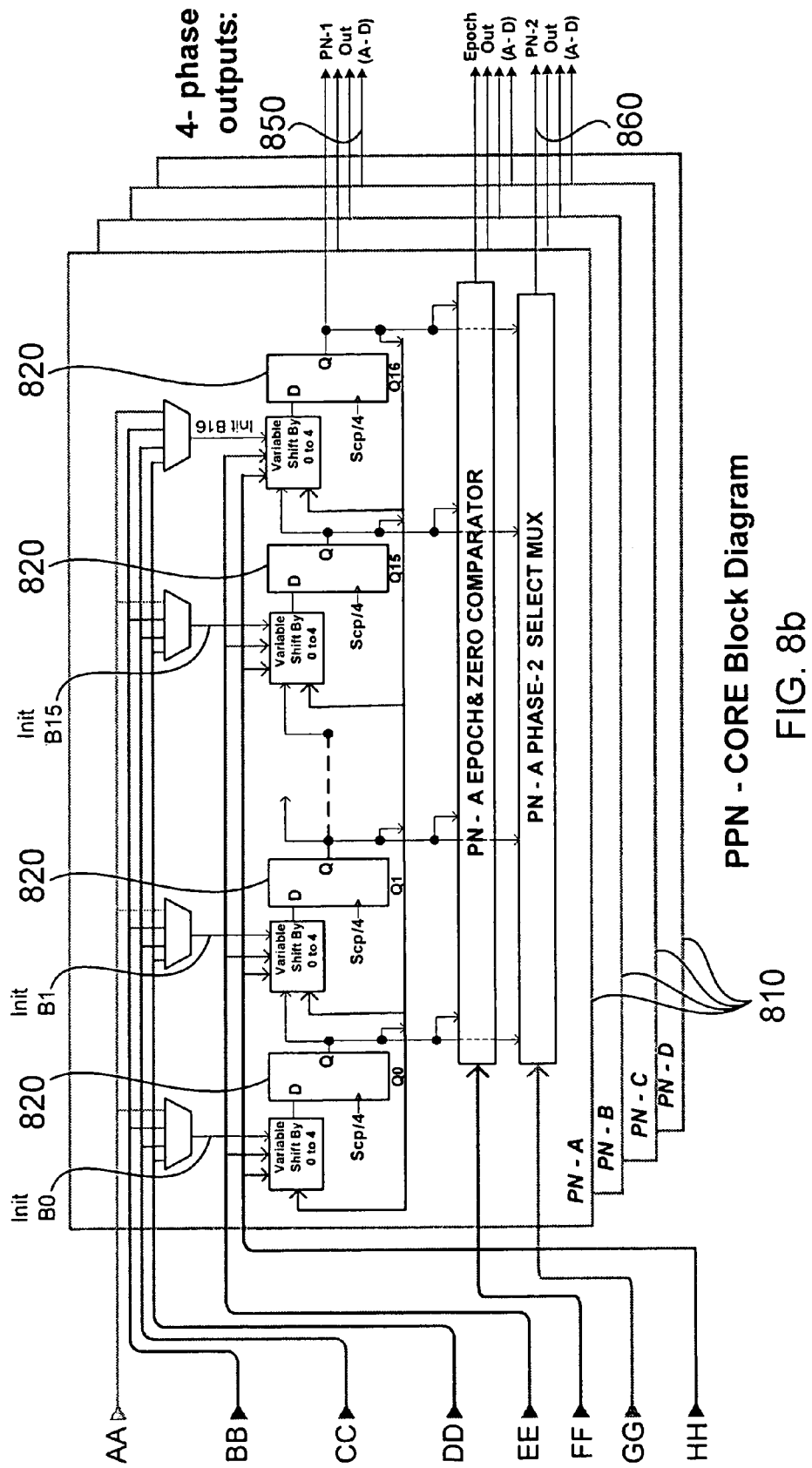
FIG. 8b is a second page of the illustration of FIG. 8a depicting an example embodiment of a parallel PN generator system comprised of L PN generators in accordance with an embodiment of the present invention.

A system having a plurality of parallel PN generators can be initialized as follows. The first phase generator, PN-A can be initialized to any state of a regular PN code. Each succeeding P-PN phase, B, C, D, . . . , L, can be initialized to a state advanced by one with respect to the preceding phase. For example, for a system having four generators, each with a 17 stage PN with taps $T_{(0-16)}$, the system can be initialized as follows:

{for i=1 to 16}
  INIT Phase-A:
    $IA_0 = I_0$
    $IA_i = I_i$
  INIT Phase-B:
    $IB_0 = T_0 \text{ AND } IA_{16}$;
    $IB_i = [T_i \text{ AND } IA_{16}] \text{ XOR } IA_{(i-1)}$;
  INIT Phase-C:
    $IC_0 = T_0 \text{ AND } IB_{16}$;
    $IC_i = [T_i \text{ AND } IB_{16}] \text{ XOR } IB_{(i-1)}$;
  INIT Phase-D:
    $ID_0 = T_0 \text{ AND } IC_{16}$;
    $ID_i = [T_i \text{ AND } IC_{16}] \text{ XOR } IC_{(i-1)}$;

In one embodiment, a parallel PN generator system 800 comprised of L PN generators 810 can be implemented as shown in FIGS. 8a and 8b. The callouts in FIG. 8a of AA, BB, CC, and so forth, represent lines coupled to the callouts AA, BB, and CC of FIG. 8b respectively. Each PN generator can include a variable means for advancing each shift register by 0 to L, where L is the number of parallel generators in the system. The example embodiment in FIGS. 8a and 8b shows four PN generators A-D. Each generator can have a predetermined number of shift registers 820, depending upon the desired length of the PN code. Each shift register may be implemented using a flip flop. The example embodiment includes a set of primary 830 and secondary 840 registers which can be used to enable early epoch detection. Early epoch detection can allow for latency in the hardware. For example, it may take 16 clock cycles for the hardware to implement zero insertion for the system to output an even code, as previously discussed.

The PN code from the plurality of PN generators 810 can be multiplexed together and output from the system 800. The multiplexer can be internal to the system or may be implemented using an external multiplexing device. The system may include two or more outputs having different phases. In the embodiment of FIGS. 8a and 8b, a first output 850 and a second output 860 can be used to output the PN code at different phases. The different phase outputs may be used to generate an I PN code and a Q PN code. The first and second outputs can also be combined to obtain various binary PN codes such as Gold-codes and Kasami-codes.

Figure 9:
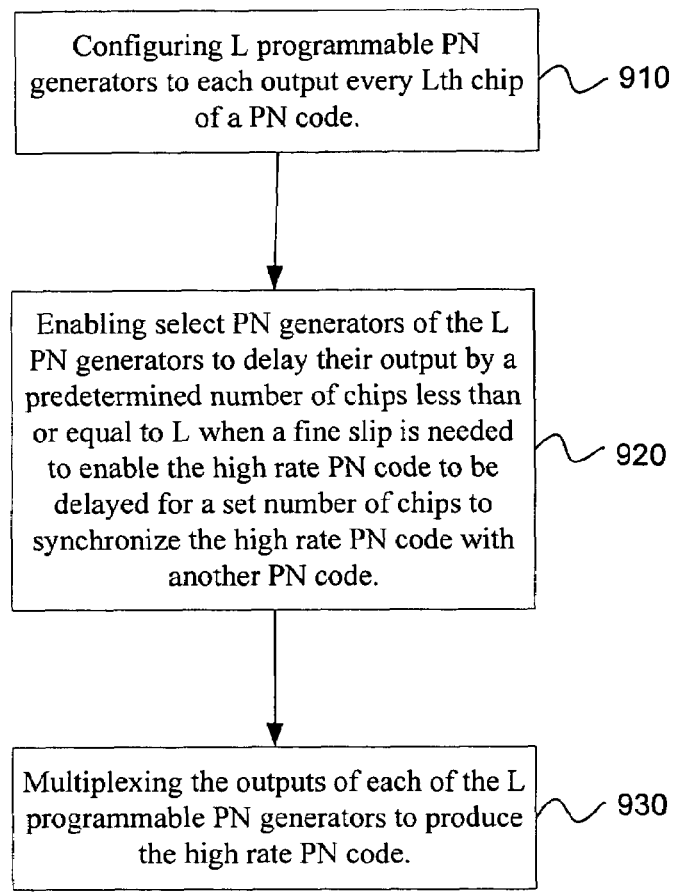
FIG. 9 is a flow chart depicting a method for generating a high rate pseudo-random noise (PN) code with a parallel PN generator in accordance with an embodiment of the present invention.

In one embodiment, a method for generating a high rate pseudo-random noise code with parallel PN generators is disclosed, as illustrated in the flow chart of FIG. 9. The method includes the operation of configuring L programmable PN generators to each output every Lth chip of a PN code, as shown in block 910.

A further operation involves enabling select PN generators of the L PN generators to delay (or hold constant) their output by a predetermined number of chips less than or equal to L when a fine slip is needed to enable the high rate PN code to be delayed for a set number of chips to synchronize the high rate PN code with another PN code, as shown in block 920. As previously discussed, a delay of a predetermined number of chips can be implemented in the L PN generators using the equation:

$$N = Lm + R; R < L,$$

where N is the number of chips to be slipped, L is the number of PN generators, m is the number of clock cycles each of the L generators should be placed in a frozen state, and R is a remainder. A frozen state can be defined as a state wherein each PN generator's output is static or produces an output that is the same output as the previous chip. The number of coarse slips, or clock cycles when each of the L generators are placed in a frozen state, can be determined using modular mathematics, wherein the MOD(L) quotient is equal to m and the MOD(L) remainder is equal to R. In a system having four generators, m is equal to the MOD4 quotient and R is equal to the MOD4 remainder. A fine slip can be used to delay a parallel PN generator output by an amount less than or equal to L chips.

Another operation involves multiplexing the outputs of each of the L programmable PN generators together to produce the high rate PN code, as shown in block 930. The high rate PN code can have a clock rate L times each of the L programmable PN generator's clock rate. In another embodiment, the high rate PN code can have a clock rate equal to the sum of the clock rate of the L programmable PN generators. Any type of multiplexer can be used. The multiplexer can be configured to operate at a clock frequency L times the frequency of the L PN generators.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for generating a pseudo-random noise (PN) code with parallel PN generators, comprising the steps of:
    configuring L programmable PN generators to each output every Lth chip of a PN code;
    enabling select PN generators of the L PN generators to delay their output by a predetermined number of chips less than or equal to L for a fine slip to enable the high rate PN code to be delayed for a set number of chips to synchronize the high rate PN code with another PN code; and
    multiplexing the outputs of each of the L programmable PN generators to produce the high rate PN code.

2. A method as in claim 1, further comprising the step of enabling the output of each of the L PN generators to freeze when a coarse slip is needed.

3. A method as in claim 2, wherein the step of enabling the output to freeze when a coarse slip is needed further comprises the step of slipping the high rate PN code for a predetermined number of chips equal to a multiple of L by repeating a previous output of each of the L programmable PN generators.

4. A method as in claim 3, wherein repeating a previous output of each of the L programmable PN generators further comprises repeating a previous output for a number of chips equal to a MOD L quotient of the predetermined number of chips.

5. A method as in claim 1, wherein the step of enabling a fine slip further comprises the step of slipping the high rate PN code for a predetermined number of chips less than L by enabling the output of select PN generators of the L PN generators to be advanced by a predetermined number of chips less than L to synchronize the high rate PN code with another PN code.

6. A method as in claim 5, wherein slipping the high rate PN code for a predetermined number of chips less than L further comprises slipping the high rate PN code for a number of chips equal to a MOD L remainder of the predetermined number of chips.

7. A method as in claim 1, wherein the step of multiplexing the outputs to produce the high rate PN code further comprises multiplexing the outputs of each of the L programmable PN generators to produce the high rate PN code having a chip rate substantially equal to a sum of the chip rates of the L programmable PN generators.

8. A method as in claim 1, further comprising the step of programming one or more inputs on each of L programmable PN generators to enable the L programmable PN generators to each produce the PN code.

9. A method as in claim 8, wherein the step of programming one or more inputs further comprises programming one or more initial state registers.

10. A method as in claim 8, wherein the step of programming one or more inputs further comprises programming one or more taps registers.

11. A method as in claim 8, wherein the step of programming one or more inputs further comprises programming one or more epoch registers.

12. A method as in claim 8, further comprising configuring the one or more initial state registers as programmable variable taps and INIT registers to enable each of the L programmable PN generators to be configured to produce a PN sequence having a predetermined length.

13. A method as in claim 1, further comprising configuring each of the L programmable PN generators to enable early epoch detection.

14. A method as in claim 1, further comprising the step of inserting an epoch into the PN code of any of the L programmable PN generators.

15. A method as in claim 1, further comprising configuring each of the L programmable PN generators to be capable of inserting a zero after an epoch to enable generation of an even mode PN sequence by slipping the PN code of the programmable PN generator that produces the epoch by a chip by enabling the output of select PN generators of the L PN generators to be advanced by a predetermined number of chips less than L.

16. A method as in claim 1, further comprising configuring the L programmable PN generators to insert a truncated mode pseudorandom sequence by inserting new initial values into the L programmable PN generators at the epoch, wherein the epoch occurs at one of the L programmable generators.

17. A method as in claim 1, wherein the step of multiplexing the outputs of the L programmable PN generators further comprises the step of multiplexing the outputs of the L programmable PN generators to produce at least two high rate PN codes, wherein each of the at least two high rate PN codes are out of phase with each other.

18. A method as in claim 17, further comprising the step of combining the at least two high rate PN codes to generate a PN codes selected from the group consisting of a binary PN code, an I PN code, a Q PN code, a Gold code, and a Kasami code.

19. A method as in claim 1, further comprising the step of initializing the L programmable PN generators by initializing a first of the L PN generators to any state of the PN code and initializing each succeeding PN generator to a state advanced by one with respect to a preceding PN generator.

20. A method for generating a pseudo-random noise (PN) code, comprising the steps of:
    programming one or more inputs on each of L programmable PN generators to enable the L programmable PN generators to each produce a PN code;
    configuring each of the L programmable PN generators to output every Lth chip of the PN code;
    slipping the high rate PN code for a predetermined number of chips equal to a multiple of L by repeating a previous output of each of the L programmable PN generators for a MOD L quotient of the predetermined number of chips;
    slipping the high rate PN code for a predetermined number of chips less than L by enabling the output of select PN generators of the L PN generators to be advanced by a predetermined number of chips less than L; and
    multiplexing the outputs of each of the L programmable PN generators together to produce a PN code having a chip rate substantially equal to a sum of the chip rates of the L programmable PN generators.

21. A method for generating a pseudo-random noise (PN) code, comprising the steps of:
    configuring L programmable PN generators to output a chip every Lth chip of a PN code;
    enabling the output of each of the L PN generators to freeze for a coarse slip; and
    enabling the output of selected PN generators of the L PN generators to be advanced by a predetermined number of chips less than L for a fine slip.

22. A method as in claim 21, further comprising the step of programming one or more inputs on each of L programmable PN generators to enable the L programmable PN generators to each produce a PN code.

23. A method as in claim 21, further comprising the step of multiplexing the outputs of each of the L programmable PN generators together to produce a PN code having a chip rate substantially equal to a sum of the chip rates of the L programmable PN generators.

24. A parallel pseudo-random noise (PN) generator system for generating a PN code sequence, comprising:
   L PN generators, wherein each PN generator comprises a plurality of shift registers configured to each produce a PN-code sequence;
   a variable means for advancing select shift registers of the plurality of shift registers between 0 and L chips;
   an early epoch detection means; and
   a multiplexer configured to multiplex the PN code sequence of each of the L PN generators to produce a PN code sequence having a chip rate a plurality times faster than a chip rate of each of the L PN generators.

25. The parallel PN generator system of claim 24, wherein the variable means for advancing each shift register further comprises a means for slipping the PN code sequence by freezing an output of each of the L PN generators for a predetermined number of chips to produce a coarse slip in the PN codes sequence.

26. The parallel PN generator system of claim 24, wherein the variable means for advancing each shift register further comprises a means for slipping the PN code sequence by of a predetermined number of chips less than L by enabling the output of select PN generators of the L PN generators to be advanced by a predetermined number of chips less than L.

* * * * *